(12) United States Patent
Van Der Meijden et al.

(10) Patent No.: US 9,045,914 B2
(45) Date of Patent: Jun. 2, 2015

(54) POOL ACCESSORIES AND SYSTEMS

(75) Inventors: Hendrikus Johannes Van Der Meijden, Midrand (ZA); Alexis Adrian Felipe Wadman, Amstelveen (NL); Robin Owen Ellis, Pine Ridge, FL (US)

(73) Assignee: RED LEOPARD, LLC, Pine Ridge, FL (US)

( * ) Notice: Subject to any disclaimer, the term of this patent is extended or adjusted under 35 U.S.C. 154(b) by 959 days.

(21) Appl. No.: 12/620,415

(22) Filed: Nov. 17, 2009

(65) Prior Publication Data

US 2010/0122949 A1    May 20, 2010

Related U.S. Application Data

(60) Provisional application No. 61/115,417, filed on Nov. 17, 2008.

(51) Int. Cl.
*E04H 4/16*    (2006.01)
*B25G 1/04*    (2006.01)
*B25G 3/24*    (2006.01)
*F16B 7/14*    (2006.01)

(52) U.S. Cl.
CPC ....... *E04H 4/1609* (2013.01); *Y10T 403/32501* (2015.01); *B25G 1/04* (2013.01); *B25G 3/24* (2013.01); *E04H 4/1618* (2013.01); *F16B 7/1454* (2013.01)

(58) Field of Classification Search
USPC ............. 15/1.7; 210/167.1, 167.19, 470, 471; 4/490, 496; 43/7, 11, 12
See application file for complete search history.

(56) References Cited

U.S. PATENT DOCUMENTS

| | | | | |
|---|---|---|---|---|
| 407,709 | A | * | 7/1889 | White ............................ 43/12 |
| 2,205,706 | A | * | 6/1940 | Wolff .......................... 210/495 |
| 2,383,696 | A | * | 8/1945 | Thompson .................... 192/46 |
| 4,003,100 | A | * | 1/1977 | Whitaker ....................... 15/1.7 |
| 4,013,563 | A | * | 3/1977 | Petrik .......................... 210/407 |
| 4,225,437 | A | * | 9/1980 | Woodard ..................... 210/223 |
| 4,481,117 | A | * | 11/1984 | Collins ........................ 210/776 |
| 5,137,623 | A | * | 8/1992 | Wall et al. .................... 210/238 |
| 5,154,449 | A | | 10/1992 | Suei |
| 5,342,513 | A | * | 8/1994 | Wall et al. .................... 210/238 |
| 6,209,729 | B1 | * | 4/2001 | Brouillard ................... 210/470 |
| 6,302,277 | B1 | * | 10/2001 | Resh ........................... 210/471 |
| 6,358,410 | B1 | * | 3/2002 | Lambert ...................... 210/238 |
| 6,368,502 | B1 | * | 4/2002 | Resh ........................... 210/238 |

FOREIGN PATENT DOCUMENTS

| | | |
|---|---|---|
| DE | 29813686 | 11/1998 |
| DE | 102004048065 | 4/2006 |
| EP | 1741937 | 1/2010 |

* cited by examiner

*Primary Examiner* — Robyn Doan
(74) *Attorney, Agent, or Firm* — Allen Dyer Doppelt Milbrath & Gilchrist

(57) ABSTRACT

A net for use with a pool cleaning system includes a net material portion and a frame body. The frame body has a flexible inner frame portion providing structural support but deformable when pressed against a surface, and an outer, flexible rim portion that is more malleable than the flexible inner frame portion and configured to provide a flexible rim edge for scooping.

12 Claims, 19 Drawing Sheets

POOL ACCESSORIES AND SYSTEMS

This application claims the benefit of U.S. Provisional Application Ser. No. 61/115,417, filed Nov. 17, 2008 titled "Pool Accessories and Systems," the entire contents of which are hereby incorporated by reference.

FIELD OF THE INVENTION

This invention relates generally to accessories used for cleaning and caring for pools, spas, and other bodies of water. One embodiment relates to a unique locking system that may be used to secure a pole, such as a telescoping pole, to various pool accessories. One advantage of the locking system is that it provides a more secure, rigid lock between the pole and the accessory. Further embodiments relate to improvements in various accessories that allow for more effective and efficient use.

BACKGROUND OF THE INVENTION

Pool accessories and manual pool cleaning systems have existed for many years. The designs have evolved over the years, but all current systems are generally similar in design, appearance, and function. In fact, there has been little new development with these products and accessories over the last several years. One basic feature that pool accessories have in common is that they are predominantly manual cleaning systems, although some of the cleaning attachments use the existing power/suction provided by the main swimming pool filtration system. The primary elements of current pool accessories are telescopic or telescoping poles, brushes, nets, and vacuum heads.

Telescopic poles are typically manufactured from either aluminum or fiberglass. The pole is normally provided in multiple sections that can telescope into and out of each other, thereby allowing the user to adjust the overall length of the pole. The cross-section of current telescopic poles is round. One end of the pole has a closed end and the other end is open, to allow the various cleaning attachments to be fixed into the open end. The most common methods of fixing attachments or accessories to the end of the pole are generally very simple—there are usually two small holes on the same axis close to the open end of the pole. Each cleaning attachment has a simple spring-loaded plastic clip that is compressed to allow the accessory end with the clip to enter the pole. The clip then springs into place when it aligns with the holes, much like a ball and detent mechanism. In some cases, the clip is replaced by a simple threaded metal screw and nut, with a corresponding set of threads on the open end of the pole to receive the attachment via a threaded attachment. The clip attachment system achieves the desired attachment, but it tends to be loose and somewhat imprecise. There is only one point of contact keeping the system together—the spring clip that cooperates with two small holes. These common cleaning attachments thus frequently "wobble" in use. The screw/nut design may be more secure, but it takes considerable time to change attachments and the connection can freeze into place due to rust and/chemical corrosion over time.

One of the attachments typically used in connection with a telescopic pole is a brush. Brushes typically have bristle sections made from either plastic (polypropylene, nylon, or polyester) or stainless steel. The bristles are generally fixed into a plastic frame, which is sometimes reinforced with an aluminum backing. The frame includes a connection section, which enables the brush to be fixed at its center point to a telescopic pole. This connection section typically includes the spring-loaded plastic clip referred to above. The angle of the brush head is either fixed in one position or, in a few cases, the user can select one of a small number of alternate positions. In these cases, the position selection is made prior to use, and the brush head is fixed while in use. If the user wishes to change the angle of the brush head, it is necessary to withdraw the brush head from the pool to make the manual adjustment.

Other accessories for use with telescopic poles include skimmer nets. Skimmer nets typically have a plastic or aluminum frame with a plastic mesh net attached and stretched over the frame. The frame is rigid and typically includes a spring clip connection system as described above. The net it is stretched across the frame and is consequently quite shallow. This is to allow the net to be "skimmed" across the surface of the pool quickly and relatively easily. The skimmer net is intended to collect small debris floating on the surface of the pool, such as leaves, insects, small twigs, and so forth. Much of this small, fine, lightweight debris tends to collect around the perimeter edges of the pool, which necessitates the hard rigid frame of the skimmer net frequently coming into contact with the walls of the pool, which can scratch various pool surfaces (e.g., tiles, steps, lights, sides and/or the bottom). The hard surface of currently-available nets also often prevents the user from effectively capturing debris near steps or in corners, angles, or contours of the pool (which may all be referred to as "pool surfaces" throughout this application).

If debris is not removed from the pool in time, most will eventually become waterlogged and sink to the floor of the pool, necessitating the use of a deep net. A deep net may typically be similar in construction to the skimmer net or may have a D-type shape frame, with the main difference being that the net material is much larger and deeper, which, as the name implies, creates a deep pocket for debris to be collected and temporarily stored. Deep nets typically have the same spring clip connection system described above. Deep nets are generally used to collect debris that has sunk to the bottom of the pool, such as waterlogged leaves, or heavier items, such as small stones or items that have accidentally fallen into the pool. The deep net is generally "trawled" around the pool to collect the debris. Some deep nets have a curved leading edge, which is intended to help "scoop" debris into the net—the leading edge actually lifts the debris from the floor, and the forward motion of the net and consequent flow of water move the debris into the main net section. As the debris is picked up, the net gets heavier and heavier, and is eventually removed from the pool so that the debris can be removed from the net. The emptying process of deep nets can be quite difficult because the nets generally have a rectangular section, which makes extracting the debris from the corners of the net quite difficult.

Further accessories that are used in connection with telescopic poles are vacuum heads. Vacuum heads make use of the existing main pool filtration system in order to vacuum debris from the floor of the pool. The vacuum head is typically connected to the telescopic pole using the above-described connection systems. In addition, a flexible hose is connected to the vacuum head and to the pump suction line, typically in the pool skimmer box. The flexible hose provides a conduit for removing debris from the pool floor and depositing it in either the skimmer basket or a smaller strainer basket located in the pool pump. There are two types of vacuum heads—one type for above-ground, soft surface (e.g., vinyl) pools and another for in-ground, hard surface (e.g., gunite) pools.

Soft surface vacuum heads generally have a plastic frame with brush bristles on the underside. The bristles serve a dual purpose. They are intended to help remove debris, as well as ensure that the vacuum head does not get stuck on the pool floor (due to the suction). The hard surface vacuum head is generally mounted on wheels. The frame is typically made from a material that allows a limited amount of flexing to take place on the sides of the frame, at about 90° to the direction of travel. Both types of vacuum heads are weighted, to provide ballast to minimize the amount of lift that is generated in use. If weight is not used, the vacuum heads tend to lift from the pool surface very rapidly when the vacuum head is moved backwards.

BRIEF SUMMARY

The pool accessory systems described herein provide new design innovations that significantly improve the performance of the currently-available pool accessories. (Although the accessories referred to herein are called "pool accessories," it should be understood that they may be used for cleaning any body of water, such as spas, above-ground pools, in-ground pools, or any other body of water that may need to be cleaned or swept.) Each element of the system has unique features that provide benefits in use, although in some instances, maximum benefit is provided when all the elements are used as one cohesive system.

In one embodiment, the invention relates to a pool cleaning system, comprising: a pole having a rectangular-like cross section; an accessory connecting element having an accessory connection portion configured to cooperate with an accessory at at least two connection points and a pole connection portion configured to cooperate with the pole; a locking system associated with the pole having at least one toggle arm, such that when the pole and the pole connection portion are in cooperation with one another, the toggle arm secures the pole and the pole connection portion together; and a functional accessory configured to cooperate with the accessory connection portion. The pole may have a ribbed outer surface. In some embodiments, the pole is provided with a rounded handle at an upper portion of the pole. In other embodiments, the pole is provided in more than one section, such that the more than one pole sections telescope with respect to one another. The pole may feature a second locking system configured to secure the more than one pole sections in place.

In a specific embodiment, the locking system comprises two toggle arms associated with a collar that supports the two arms and provides a pivot point in use, each arm comprising a shoulder portion that allows the arm to clamp shut against the pole or the accessory connecting element. The system may also be used with a functional accessory, such as a brush, a net, or a vacuum head. The functional accessory may be secured by a rigid fixed connection to the accessory connection portion or it may be secured by a pivotable, rotatable connection to the accessory connection portion. The accessory connection portion may comprise two arms defining a space therebetween. In a certain embodiment, the two arms comprise ends, each end comprising an attachment mechanism configured to cooperate with a corresponding attachment feature on the functional accessory.

Further embodiments relate to a telescoping pole, comprising: an inner pole portion having a convex section; an outer pole having a concave section; and a locking system associated with the outer pole portion having at least one toggle arm with a cam configured to pivot with respect to the outer pole portion, such that when the at least one toggle arm is engaged, the inner pole and outer pole are secured together. The inner pole may telescope within the outer pole. The telescoping pole may be made of aluminum. It may also have an internal plastic sleeve positioned on the inner pole portion in order to provide a non-metallic running surface on which the outer pole can slide. Certain types of poles may have a rounded handle at an upper portion of the pole.

A further embodiment provides a net for use with a pool cleaning system, comprising a net portion; an inner frame portion; and an outer, flexible rim portion configured to provide a soft rim that can easily deform to take the shape of a pool surface. The net portion may be secured between the inner frame portion and the outer flexible rim portion. In a specific embodiment, the net portion comprises a deep net portion having an oval-shape. In another embodiment, the net may have at least two attachment features at sides of the net that allow the net to be secured with respect to a pool cleaning system. If provided as a deep net, the net may have a scooped, flexible leading edge portion having a plurality of openings.

A further embodiment provides a brush for use with a pool cleaning system, comprising a brush portion; at least two attachment features at sides of the brush portion that allow the brush to be secured to and pivot with respect to a pool cleaning system, allowing the brush to automatically swivel at a desired angle for optimum positioning. The brush may have attachment features comprise pivot points that are positioned low on the brush portion.

A further embodiment provides a vacuum head for use with a pool cleaning system, comprising: a vacuum base having a front edge and a rear edge; a pipe for securing to a pool suction system, the pipe protruding from the vacuum base closer to the front edge than the rear edge; and at least two attachment features at sides of the vacuum base that allow the vacuum to be secured to and pivot with respect to a pool cleaning system. The base may have bristles and/or wheels. It may further have a flexible disc or flaps to create a low pressure area to improve suction.

DETAILED DESCRIPTION

Locking System: Pole

Examples of locking systems and methods used in connection with embodiments of the invention are shown in FIGS. 1-3 and 6-9. In some embodiments, the locking system is used in connection with one or more or all of the accessories described below. In a general sense, the complete system includes a pole 12, an accessory connecting element 40, and a functional accessory.

Figure 1:
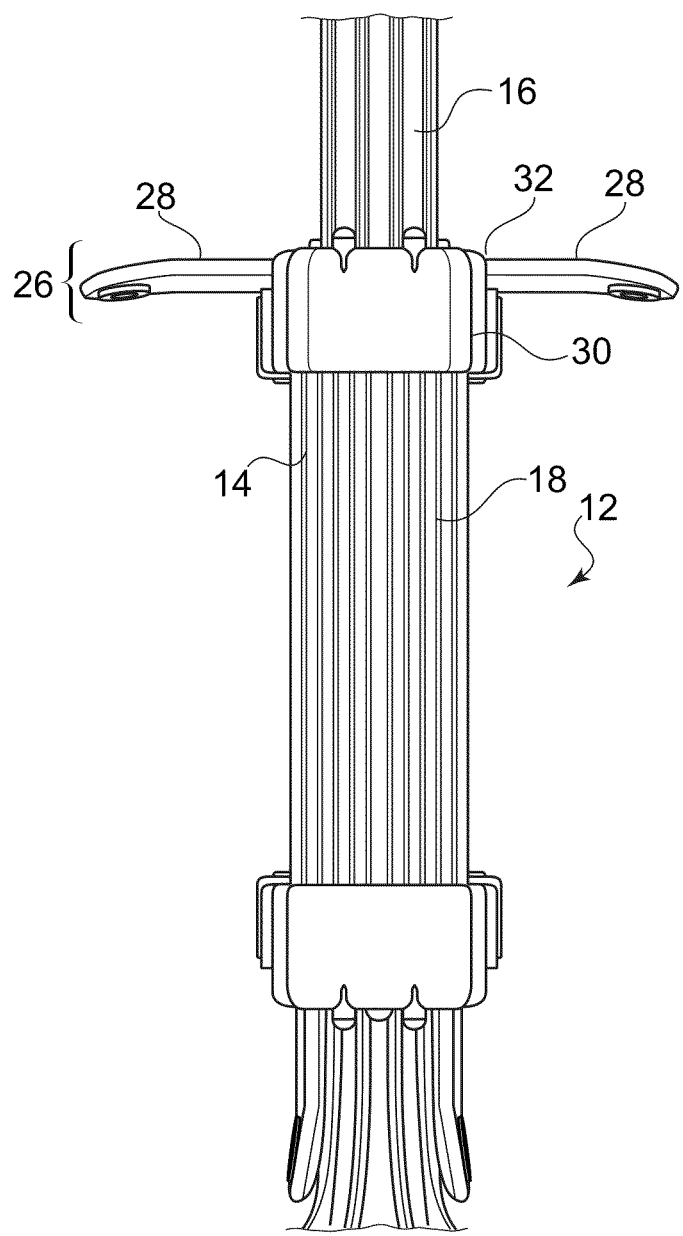
FIG. 1 shows a front view of a telescoping pole and locking system according to one embodiment of the invention.
Figure 2:
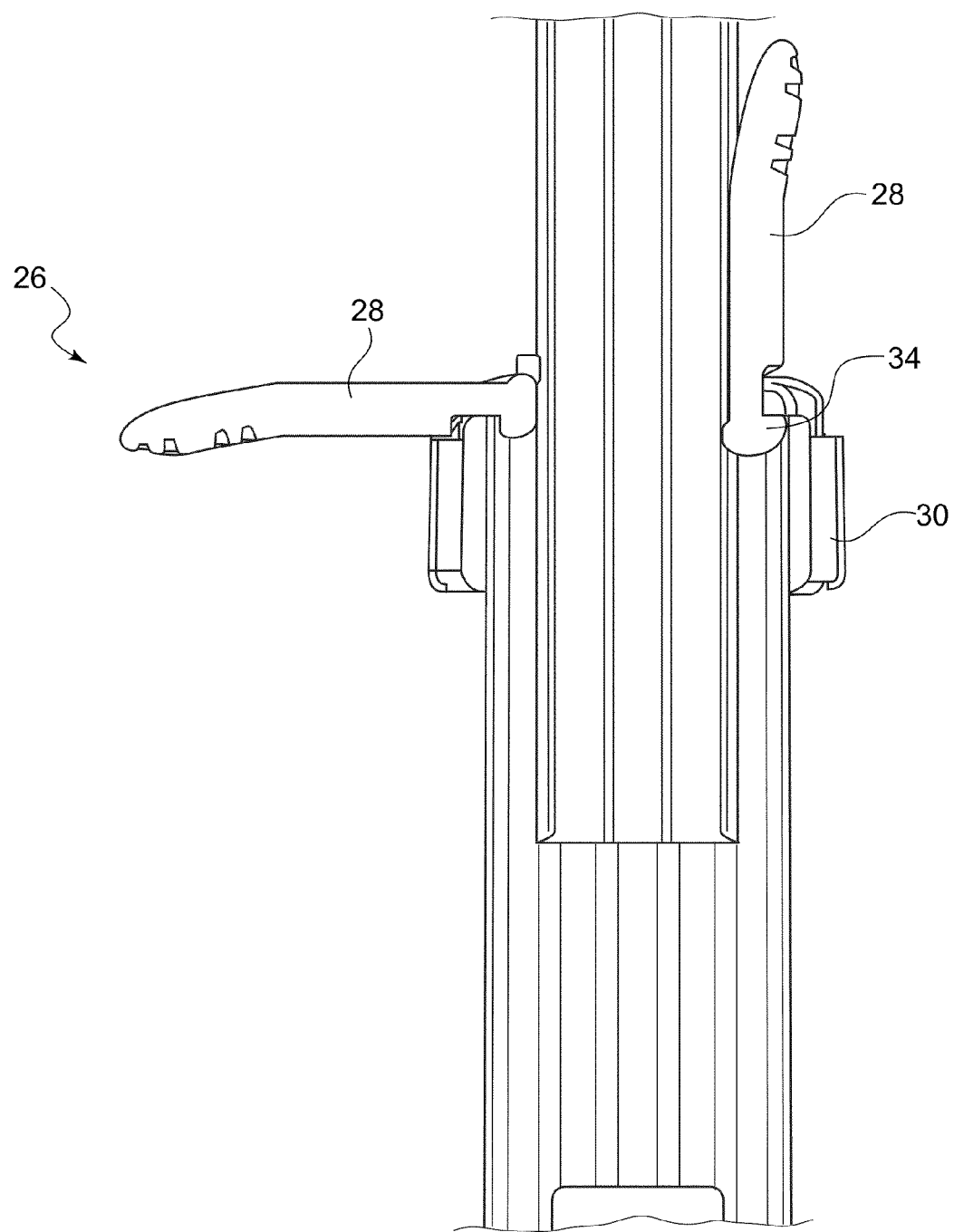
FIG. 2 shows a close-up sectional view of the locking system of FIG. 1.
Figure 3:
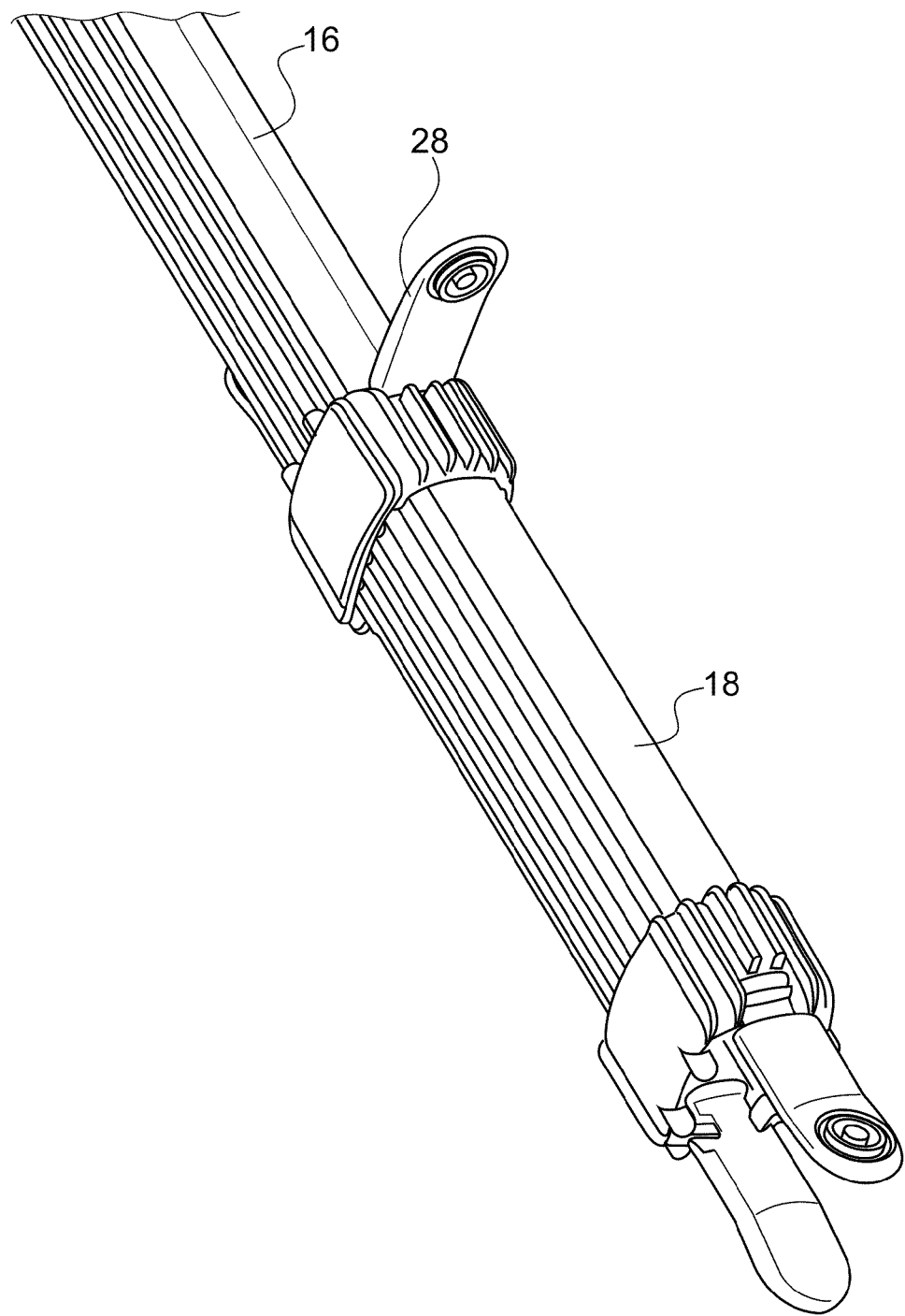
FIG. 3 shows a side perspective view of the telescoping pole and locking system of FIG. 1
Figure 4A:
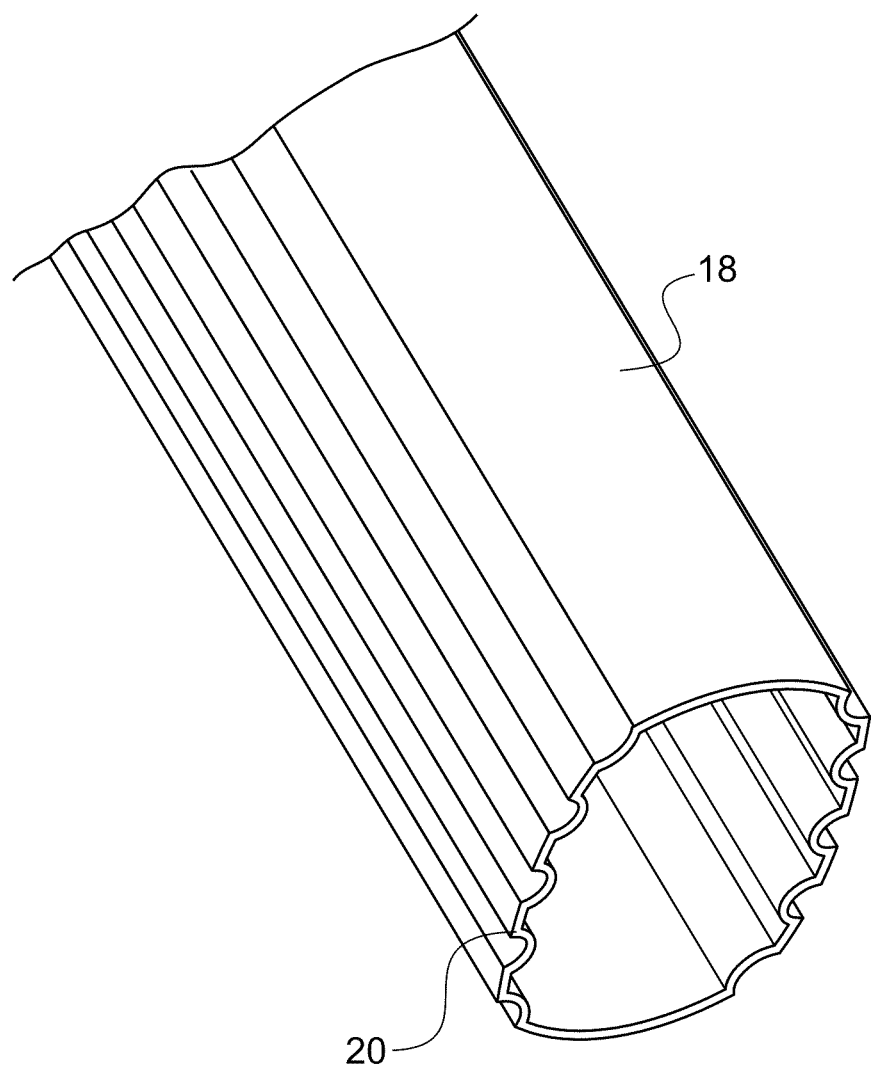
FIG. 4A shows a side perspective view of an outer pole according to one embodiment of the invention.
Figure 4B:
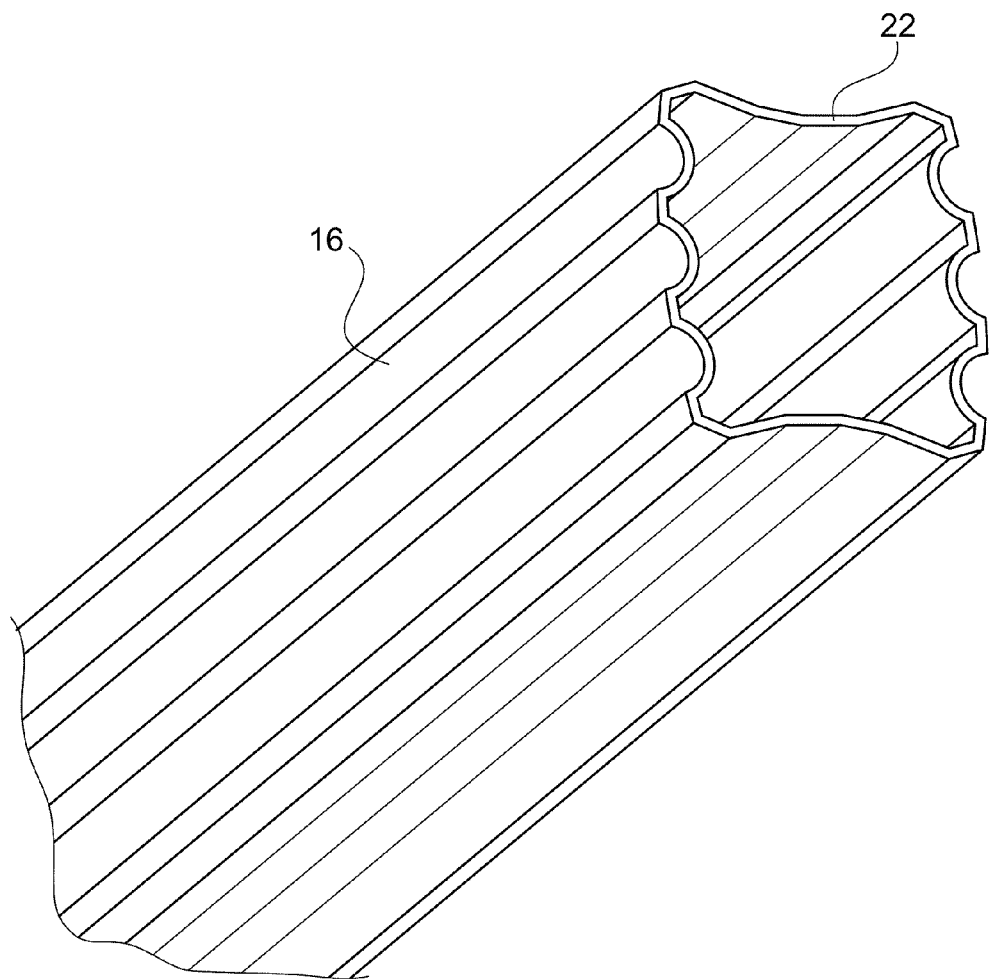
FIG. 4B shows side perspective view of an inner pole according to one embodiment of the invention.

Referring now to FIG. 1 and the related views of the pole (FIGS. 2-4), pole 12 is shown having a rectangular-like cross-section. "Rectangular-like" is intended to refer to a cross-section that is more rectangular or square-like than round, although it should be understood that harsh sharp corners need not be present—and in most instances, will not be present—in order for the cross-section to be considered rectangular-like in accordance with the embodiments described. Examples of an inner and outer pole having rectangular-like cross-sections are shown in FIGS. 4A and 4B.

It is also envisioned that other non-circular cross-sections may be used. The rectangular-like cross-section of the pole creates a firmer connection for each attachment accessory, which reduces the "wobble" that is often present with current designs. It allows the internal shape of the pole to provide support for the accessory connecting element 40 (described below), whereas conventional round poles rely on a spring clip to secure the attachment in place. In previous designs, if the spring clip is not present, the attachment can rotate through 360 degrees. However, with a rectangular-like cross-section, rotation is not possible, which creates a more rigid, secure connection. The rectangular shape also helps prevent user fumbling because the accessory connecting element fits better. The element cooperates with the pole in multiple ways, and there are not small plastic clips to precisely locate. There is also contact over a wider surface area with the rectangular-like cross-section. In essence, rather than relying on plastic pins or clips to hold the portions together and prevent rotation, the shape of the pole and the accessory connecting element, as they cooperate together, actually hold the two parts together better and prevent wobbling during use. The rectangular-like cross section profile of the pole provides for more secure control in use by reducing the risk of inadvertent rotation of the pole and helps prevent the user from having to grasp the pole as tightly as is typical with traditional round pole pool cleaning systems.

Pole 12 may also have a ribbed outer surface 14. Although some round poles may have a slightly ribbed surface, embodiments of the current design generally provide a more pronounced ribbed surface, as shown in the Figures. The ribbed design may help increase the strength that can be achieved with a rectangular-like section. It also reduces the surface area in contact with the user's hands, which can make use of the system easier in extreme (hot or cold) weather.

Figure 18:
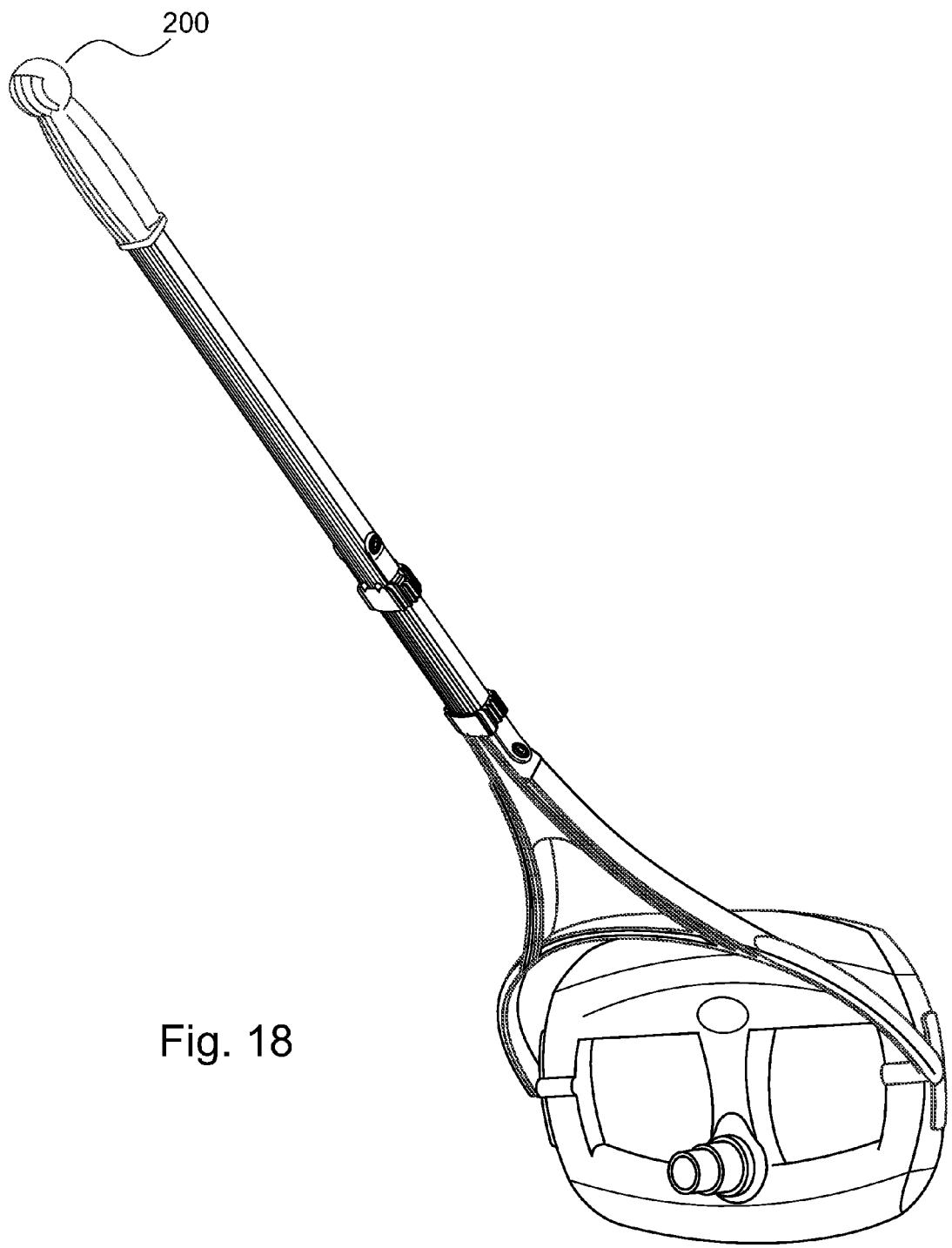
FIG. 18 shows a pole having a ergonomic, contoured handle.

Pole 12 may also be provided with a handle 200 at its upper portion, as shown in FIG. 18. This handle 200 has a rounded profile and can help assist the maneuverability of the pole by providing a comfortable ergonomic hand rest, which can add control to side-to-side and back-and-forth movement of the pole. The user may position his/her hand against or around the rounded handle 200, which provides a better fulcrum for pole movement.

As shown, the pole 12 is typically provided in more than one section such that the portions may telescope within one another. This allows the user to extend the pole to reach more distant areas of the pool. For example, there may be an inner pole portion 16 and an outer pole portion 18 that are telescopically related to one another. In one specific embodiment, outer pole portion 18 has a convex section 20 and inner pole portion 16 has a concave section 22, which together, form a cavity between the two pole portions. This cavity helps make the locking system described below work.

The pole sections (as well as the accessory connecting element) may be locked and unlocked by a toggle wedge locking system 26. The toggle wedge locking system 26 has one or more arms 28, and is shown as having two toggle arms 28. The arms are shown associated with a collar 30, which supports arms 28 and provides a pivot point 32 for the arm(s) in use. A cam or shoulder portion 34 at an upper part of arm 28 allows the toggle arms to clamp and secure another pole portion and/or an accessory connecting element in place.

For example, as the pole portions are adjusted relative to one another, the toggle arms are left in the open position, as shown in FIG. 1. Once the pole portions are adjusted as desired, the user flips arms 28 down so that cam 34 acts on the two poles and pushes them together, creating the lock. In other words, the lock is achieved by rotating the cam 34 (which is shown as having an oval-shaped profile in FIG. 2) directly between the two pole sections to achieve the clamp. This creates an interference fit between the pole portions. The cavity between the two pole portions is there to allow the toggle wedge or cam 34 to rotate and "snap" into position. (Without a cavity, between the two portions, rotation of the locking wedge/cam would likely be difficult.) As a point of interest, if just a single toggle arm 28 is used as a lock, then the cavity would likely not be needed on the side that does not have the toggle arm.

In some embodiments, an internal plastic sleeve may be inserted into the open end of the inner (or smaller) pole portion or aluminum extrusion (the end that is opposite to the handle). This sleeve provides a smooth, non-metallic running surface for the pole to slide on, which reduces metal to metal contact.

Locking System: Accessory Connecting Element

Figure 5:
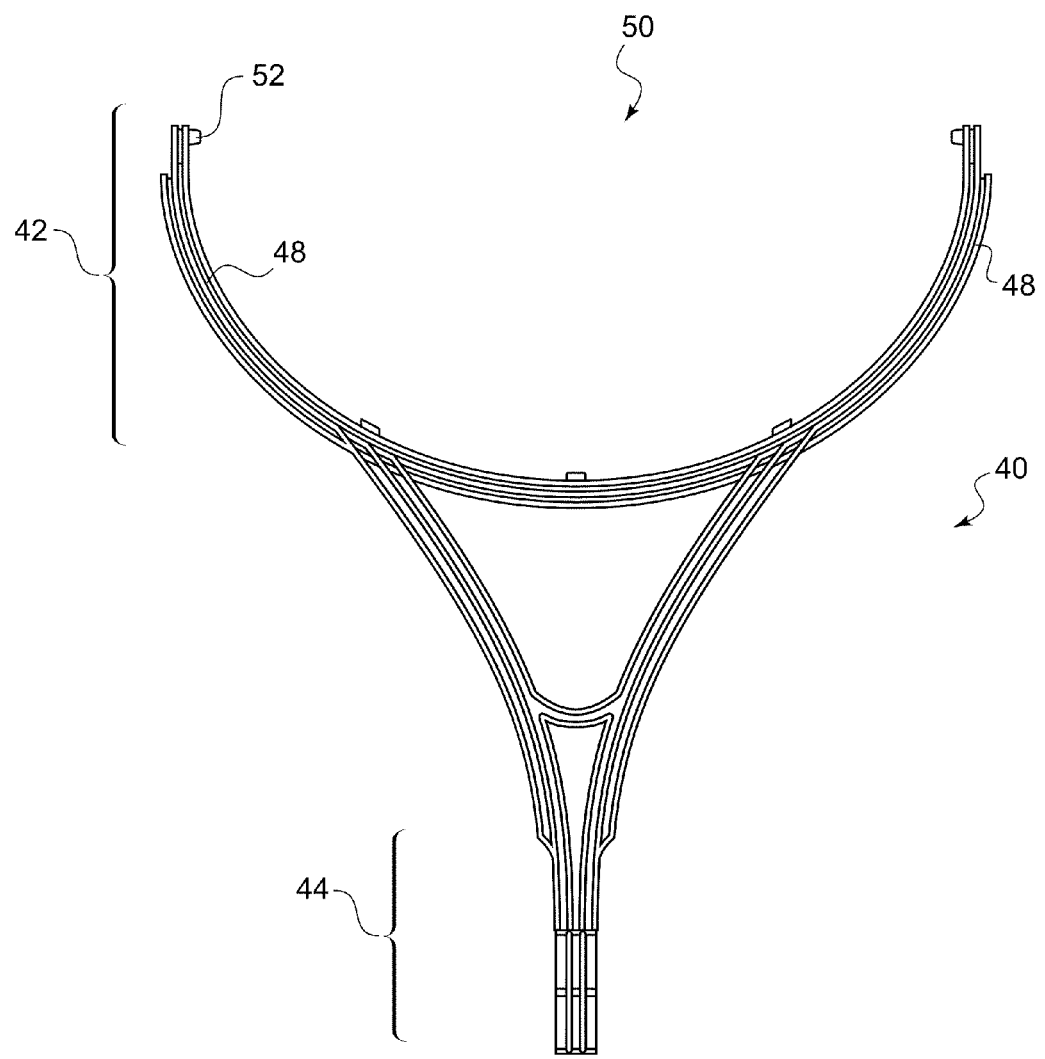
FIG. 5 shows a front plan view of an accessory connecting element according to one embodiment of the invention.
Figure 6:
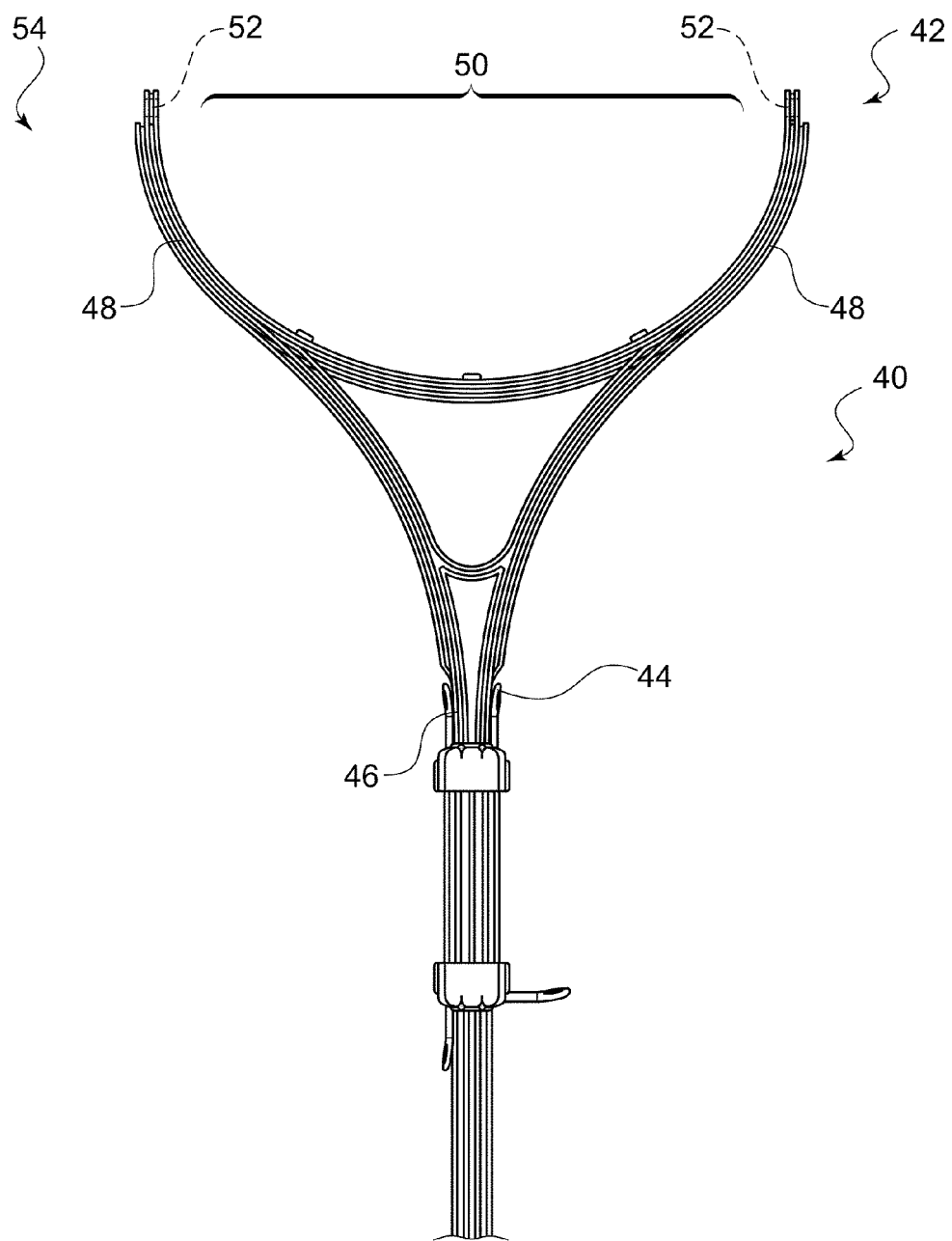
FIG. 6 shows a front plan view of an accessory connecting element secured to a telescoping pole.
Figure 7:
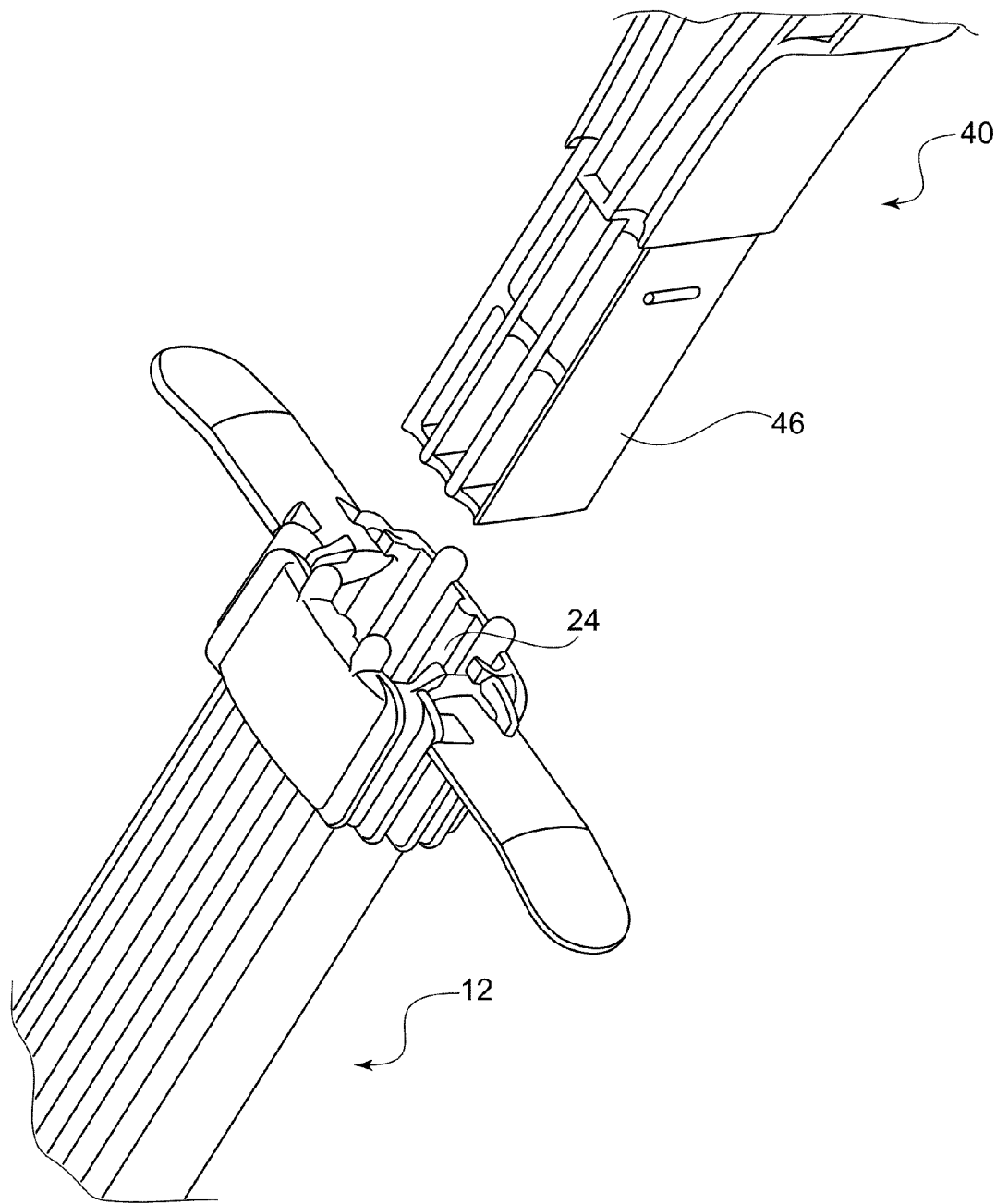
FIG. 7 shows a close-up perspective view of the accessory connecting element of FIG. 6 in the process of being secured to a pole.
Figure 8:
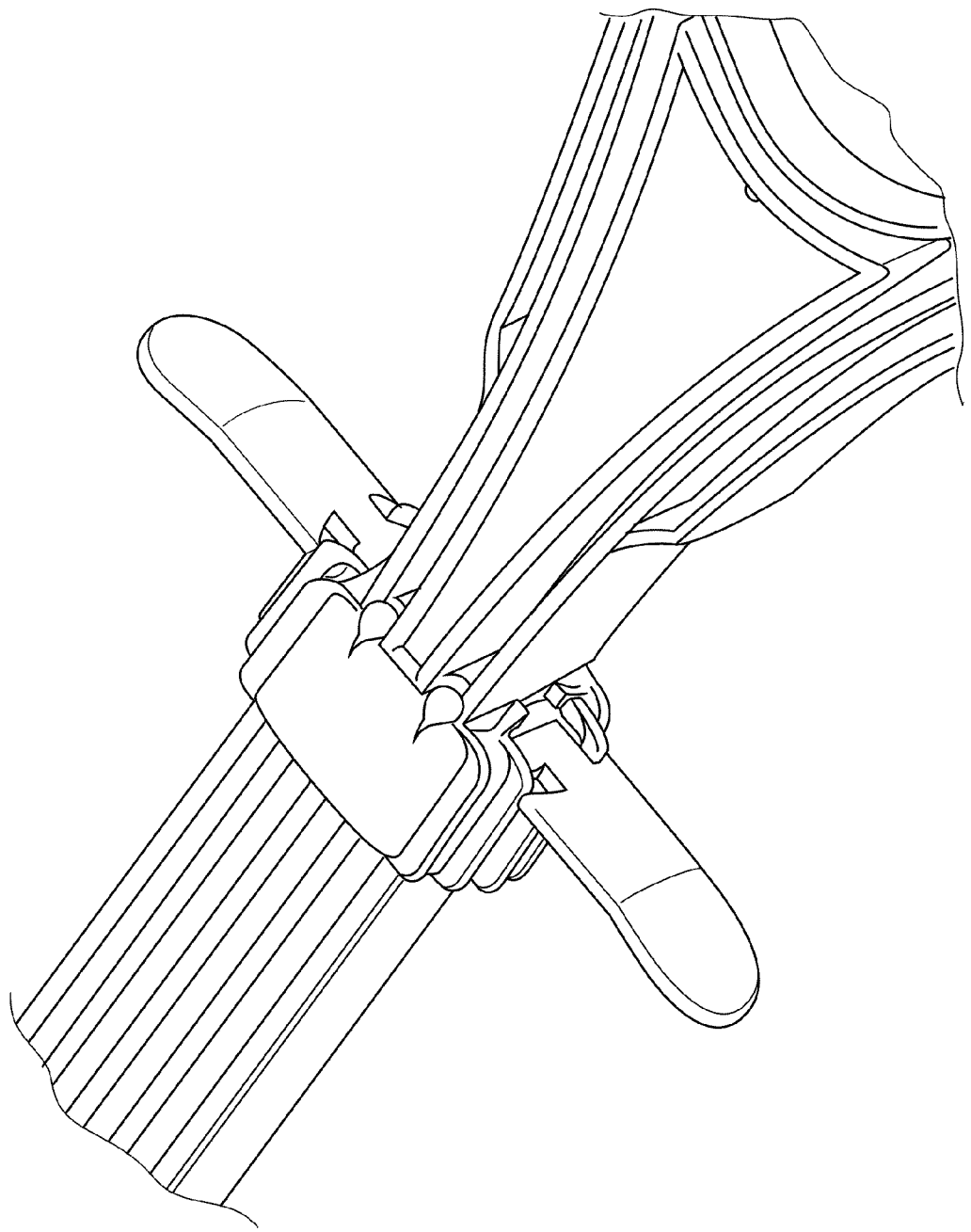
FIG. 8 shows a close-up perspective view of the accessory connecting element of FIG. 6 as it is positioned in place in an opening of a pole.
Figure 9:
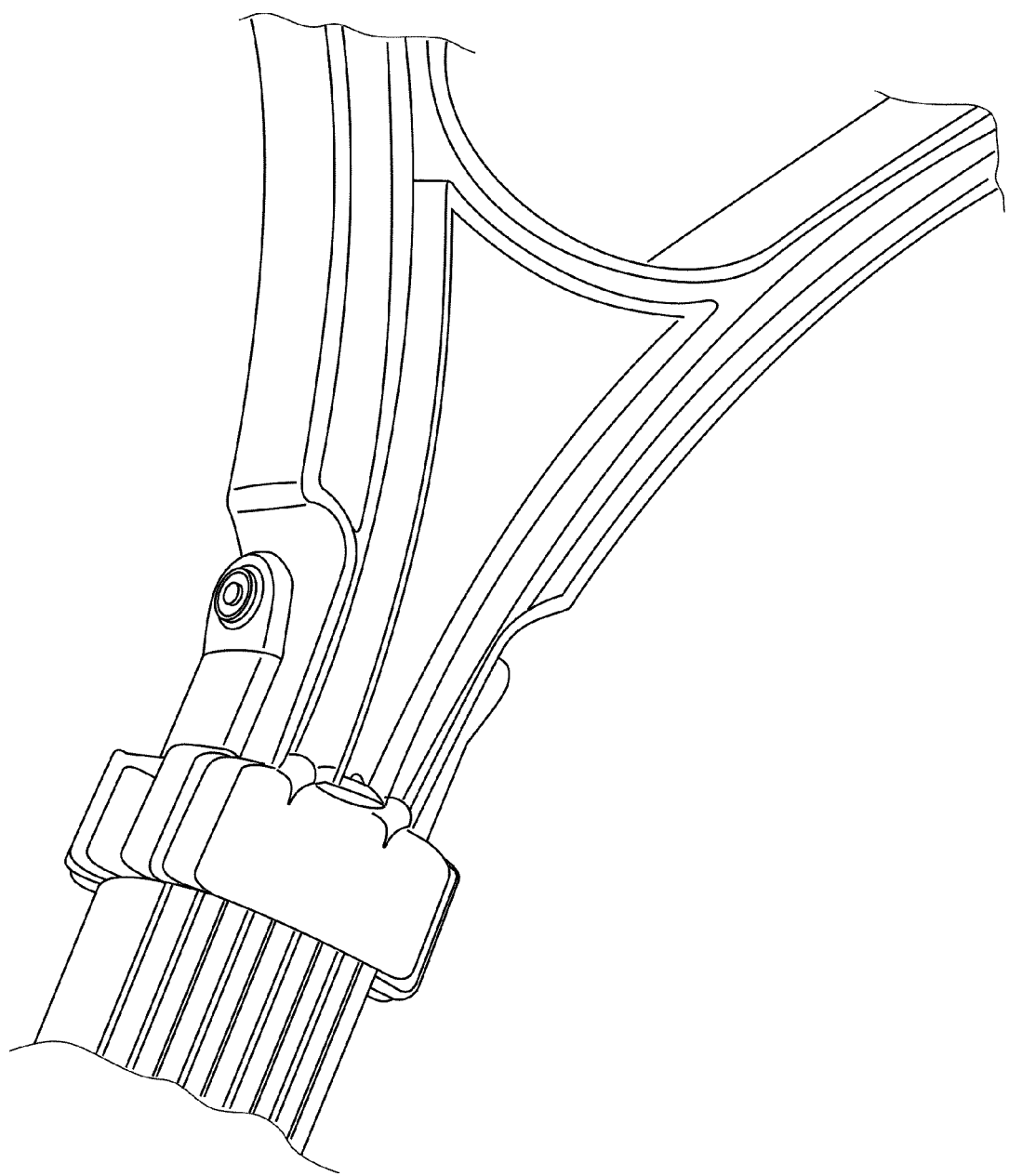
FIG. 9 shows a close-up perspective view of the accessory connecting element of FIG. 6 once locked into position within a pole.

Attached at the end of the pole 12 is an accessory connecting element 40, as shown in FIGS. 5-6. Accessory connecting element 40 has an accessory connection portion 42 and a pole connection portion 44. Typically, the pole 12 will have an open end 24 that is adapted to receive the accessory connecting element 40. As such, the pole connection portion 44 of accessory connecting element 40 is typically a male portion 46 that is received in the open end 24 of pole 12, as shown in FIGS. 7-8. (It should be understood that alternatively, the pole 12 may have a male portion and the pole connection potion 44 of the accessory connecting element 40 may be an open end.) In use, the pole connection portion 44 slides into the open end 24 of the pole 12, and the toggle locking system 26 secures the two in place, as shown in FIG. 9. The toggle arm 28 (or arms) may flip up toward the accessory connecting element 40 or they may be configured to flip back down in the other direction (e.g., toward the pole 12).

The opposite end of the accessory connecting element 40 features an accessory connection portion 42. An example is shown in FIGS. 5-6. Accessory connection portion 42 is shown having two arms 48 that create a space 50 therebetween. (Although a curved shape is shown, it should be understood that any dimension and shape may be provided between arms, as long as the space is sufficient to receive an accessory, as described below.) The end of each arm 48 has an attachment mechanism 52 that cooperates with a corresponding attachment mechanism on each accessory, providing at least two connection points for the accessory connection. This can help maintain a secure connection and add increased maneuverability to the system. Attachment mechanism 52 may be a nub or raised protrusion on each inside end of the arms, such that it is configured to be received by a corresponding opening on an accessory. An example of this embodiment is shown in FIG. 5. Alternatively, attachment mechanism 52 may be an opening extending through a portion of each of the inside area on the end of the arms 48. An example of this embodiment is shown in FIG. 6. It should also be understood that any other appropriate connecting system may be used to secure the accessory connecting element 40 to an accessory.

Once the accessory connecting element 40 is connected to the pole 12, the system is ready to receive one or more functional accessories. As example of the assembled pole/attachment system 54, which includes pole 12 and accessory connecting element 40, is shown in FIG. 6.

The wishbone-like shape of the accessory connecting element 40 and the fact that it provides two arms 48 to secure an accessory in place increases the control that a user has during use. The wishbone makes it easier to more accurately maneuver the cleaning accessory. Moreover, the accessory connecting element 40 may provide varied types of connections—it may be desirable to have cleaning nets secured in a fixed or otherwise non-rotatable position with respect to the pole, while other attachments may obtain more usefulness if provided with a pivot point or otherwise in a rotatable position with respect to the pole. Various embodiments of the accessory connecting elements provide these interchangeable options.

It may be possible to provide the accessory connecting element 40 separately from the pole 12 and other accessories, such that the element 40 may be easily replaced if need be. It may also be possible to provide the element 40 having an accessory pre-connected thereto. For example, the accessory (embodiments of which are described below) may be sold pre-clipped or pre-secured to the element 40. This may make it easier to provide a fixed connection or an adjustable connection, as desired, for various different accessories. Alternatively, the accessories may be sold individually and the user may simply secure the desired accessory to the element 40 in use.

Accessories

The assembled system 54 is designed to receive various accessories that are designed for use with the above-described locking systems. Specifically, each accessory may be configured to fit within the space 50 between arms 48 and may have attachment features at edges that cooperate with the attachment mechanisms 52 on arms. Some accessories may be designed to pivot with respect to the system in use (such as the brushes and vacuum heads), whereas others may be designed to be secured rigidly (such as the nets).

It should also be understood, however, that it is possible for the individual accessories described below to be used with existing traditional pool systems. If they are so used, the attachment of the accessory to the pole will differ from the attachments described above. In short, although the specific accessory may be most efficient when used as a part of the novel pole and locking system described above, the beneficial features of each accessory may be achieved while using a traditional pool pole clip locking system as well.

Adjusting Brush

Figure 10:
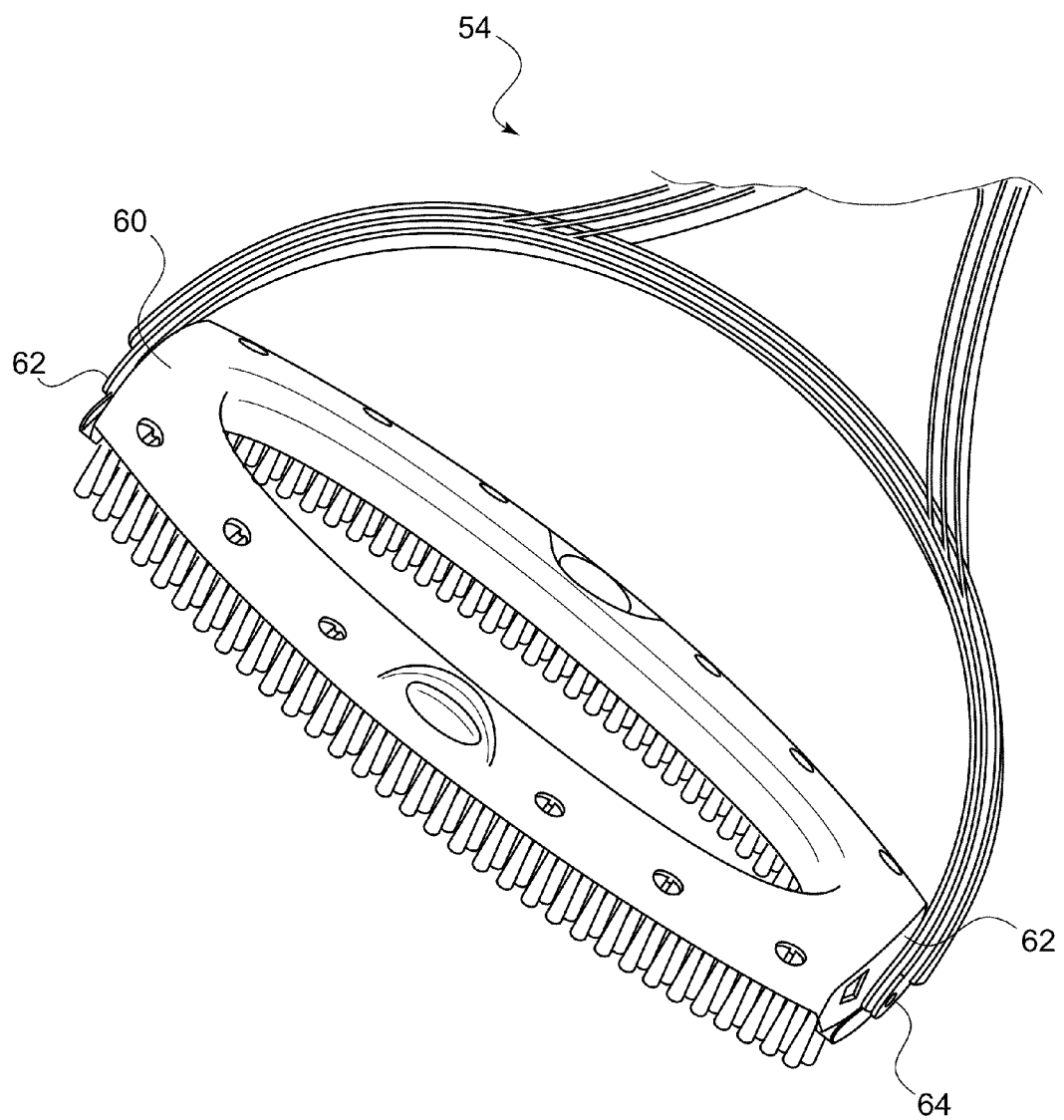
FIG. 10 shows a side perspective view of one embodiment of a brush secured to an accessory connecting element.
Figure 11:
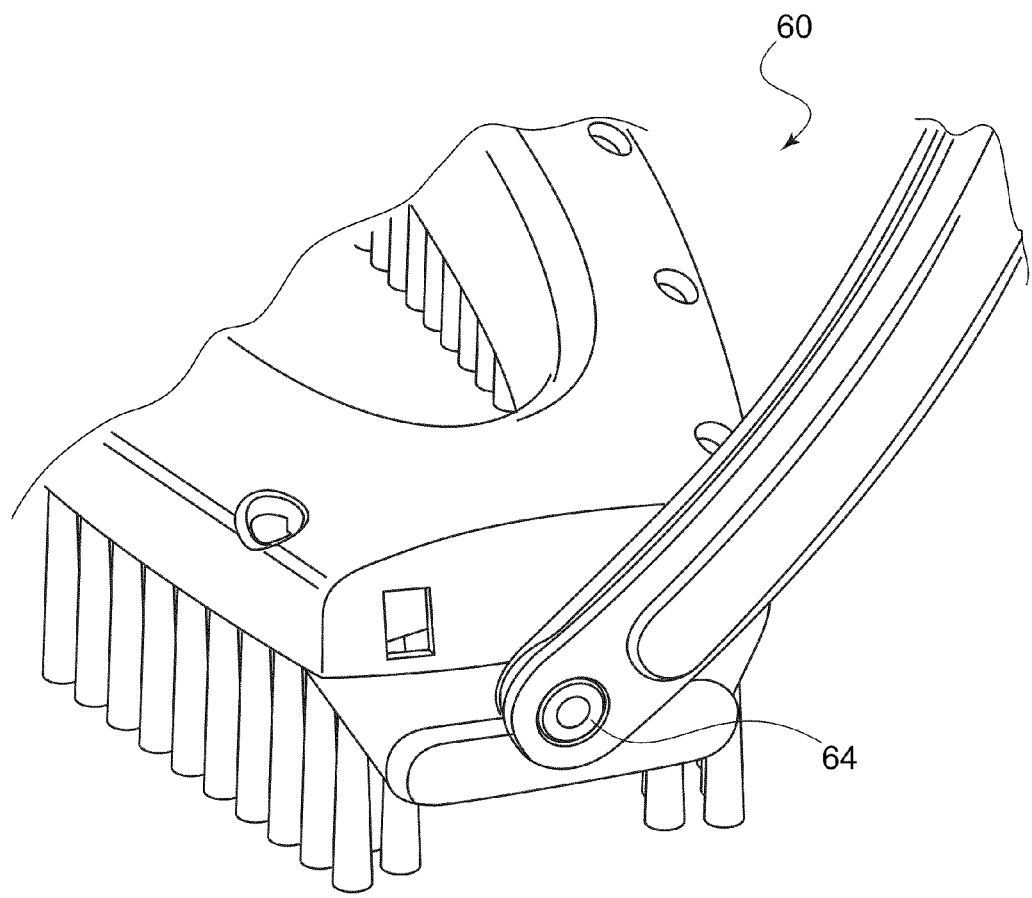
FIG. 11 shows a close-up view of the brush of FIG. 10.

Examples of an automatic adjusting brush 60 are shown in FIGS. 10-11. In some embodiments, the brush 60 has side edges 62 with attachment features 64 that allow brush 60 to pivot with respect to the assembled pole/attachment system 54. Because brush 60 connects to the pole system 54 at its sides 62 (as opposed to a fixed connection point at the center of the brush), it can pivot and swivel at various angles to automatically adjust to the optimum position during use. The pivoting is provided by pivot points on the side edges of the brush. The pivot point is relatively low, which prevents the brush 60 from turning over as the pool surface is brushed. In some embodiments, flotation in the brush head stabilizes it when immersed in water.

Skimmer Net

Figure 12:
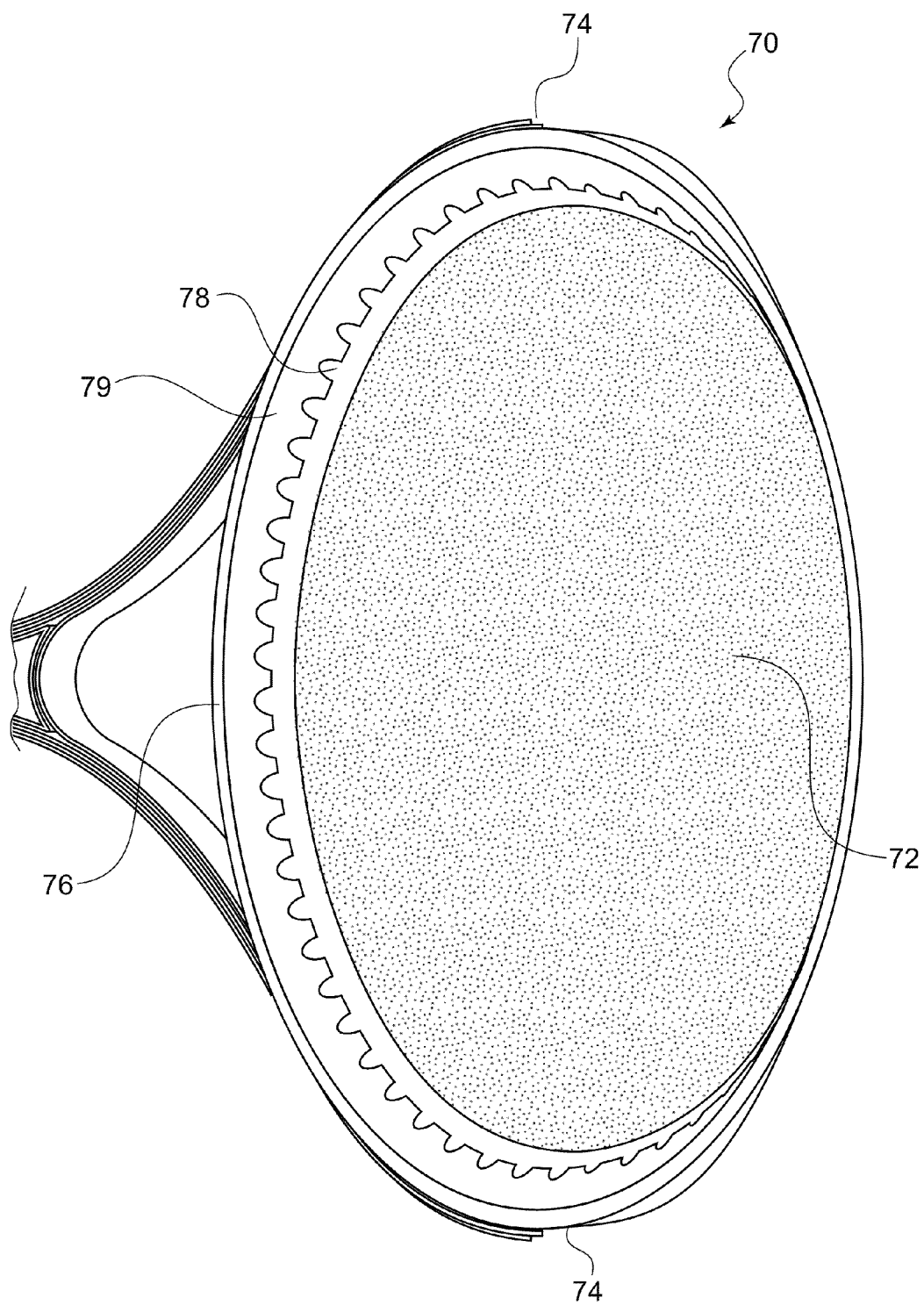
FIG. 12 shows a front perspective view of one embodiment of a skimmer net secured to an accessory connecting element.

An examples of a skimmer net 70 is shown in FIG. 12. It has a typical net portion 72 for skimming debris from the surface of the pool. Its connection to the accessory connecting element 40 allows for structural rigidity in some portions because the sides 74 of net are secured or clipped to arms 48, causing the back portion 76 of the net 70 to be secure and well supported. (It is possible for the net 70 to have a pivotable connection or a stable connection to arms 48, depending upon design requirements and customer needs.) In one embodiment, the wishbone shape of the accessory connecting element 40 supports and secures the back portion 76 of the net 70.

In one specific embodiment, skimmer net 70 is formed from two portions. A first inner portion or frame 78 provide structural support for the net. Inner frame 78 may be more rigid than the outer rim, but it is still intended to be flexible such that the net can deform when pressed against a sharp contour or corner or step of the pool. A second outer portion or rim 79 is more flexible or malleable and otherwise provides more give than the inner frame 78.

In one embodiment, the frame 78 may be formed of a sturdy material, such as plastic, polypropylene, polyethylene, aluminum, and so forth. This provides the structural rigidity needed to connect to the pole assembly 54, as well as the structure needed to allow the skimmer net 70 to resist water force in use. In another embodiment, the frame 78 may be formed of a more flexible material, such as any of those described below. It may be thicker than the rim 79 in order to provide more structural support to the net 70, but still maintain the desired flexibility of malleability.

The rim 79 may be formed of a more flexible material, such as a thermoplastic elastomer, PVC, polyurethane, thermoplastic rubber, silicone, and so forth, such that it is more "rubbery" than the frame 78. (Although examples of materials are provided above, these are intended to be examples only, and it is envisioned that any other types of materials meeting the parameters described can be used for portions 78 and 79.) The functional benefit of providing a softer rim is that it can bump or drag along the sides of the pool without damaging the pool surface. It is also easier to deform the rim 79 and cause it to take the shape of the pool surface so that the user can scoop leaves or debris from a hard to reach corner or surface, such as pool steps. When pushed, the net 70 deforms and can scoop better. After use (i.e., once the flexing is no longer needed and the net is no longer being pressed against a pool surface), the flexible frame will regain its shape. In an alternate embodiment, the entire back portion 76 of the net 70 is a more rigid material and the entire front portion of the net is a more flexible material.

The skimmer net portion 72 may be secured between the inner frame 78 and the outer flexible rim portion 79. In other words, the overmolding of the net encapsulates or traps the net material between the two net frame portions in order to add strength to the net connection.

Deep Net

Figure 13:
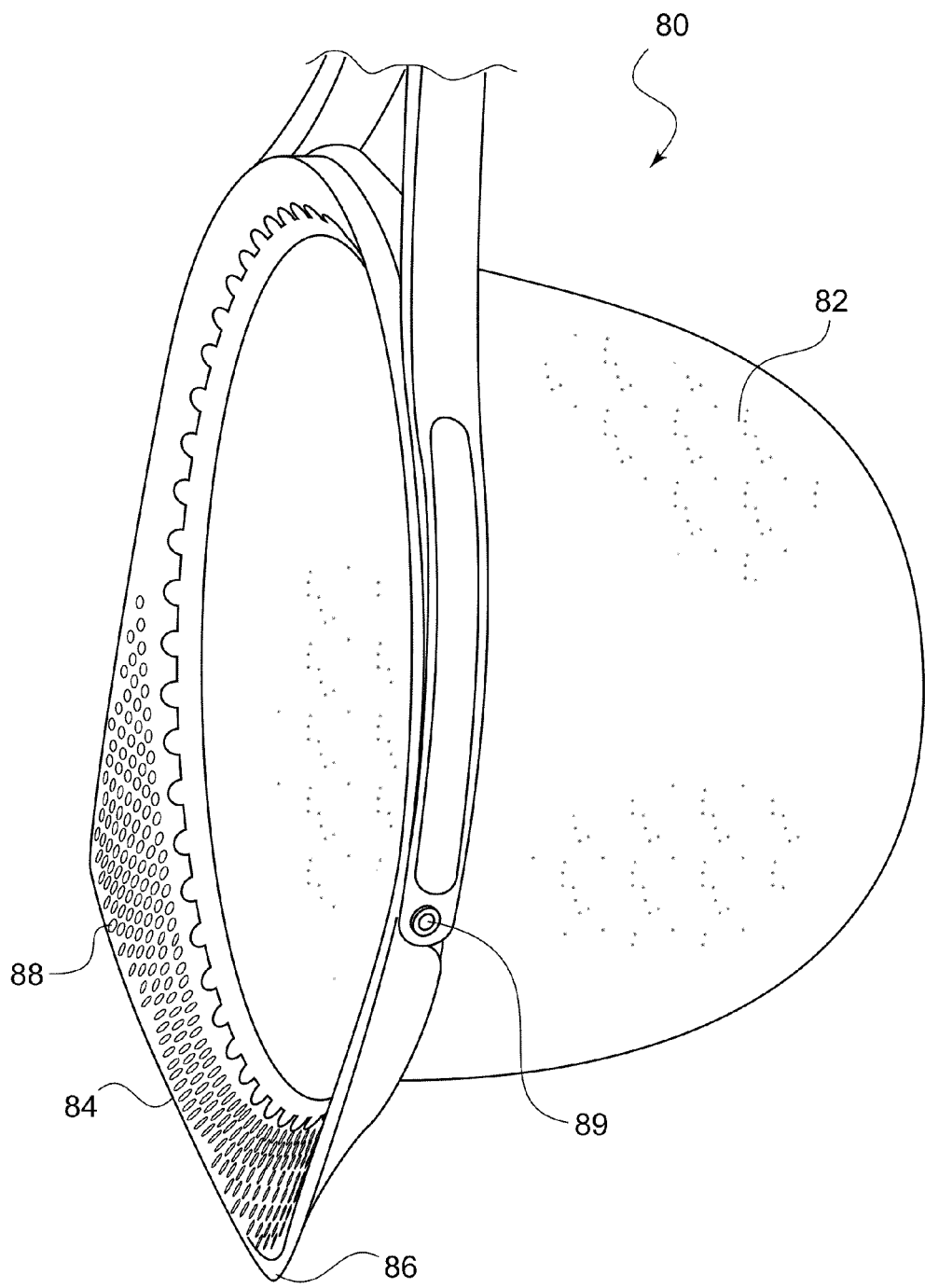
FIG. 13 shows a side perspective view of one embodiment of a deep net secured to an accessory connecting element.

An example of a deep net 80 is shown in FIG. 13. The deep net 80 has similar design features to the skimmer net, although it has a typical deep net portion 82 for holding larger amounts of debris collected from the depths of the pool. It further adds an elongated, scooped, flexible leading edge 84. Edge 84 is intended to flex and scoop an increased amount of debris from the pool floor. By providing a flexible edge 84, deep net 80 can be used to scoop under debris more easily than deep nets that have a rigid edge. The flexibility also helps prevent marring of the pool surface floor. In a specific embodiment, edge 84 is shown having a squared-off end 86, which can help act as a flat shovel for scooping debris and provides the most surface area possible. Edge 84 is also shown having openings 88 that help lower water resistance as net 80 is being used in deep water. In a specific embodiment, edge 84 is provided as a thin leading edge such that it can easily be scooped underneath debris. In an even more specific embodiment, leading edge may be anywhere from about 3 mm to about 7 mm in depth, and even more specifically, may be about 5 mm in depth. Deep net 80 may also have a similar inner frame and outer rib configuration as described above in connection with the skimmer net. The two frame portions secure the deep net 82 therebetween such that the net 82 is molded between the two frame portions.

Another beneficial feature of deep net 80 is that it has a non-rectangular shape at its scooping edge (e.g., a shape where the edges are not perfectly square or generally at an angle to one another), as opposed to most currently-available designs. Additionally, the non-rectangular, non-square, oval-like shape of the deep net 82 makes removing debris from the net easier and more efficient because debris is less likely to stick in corners of the net. (Traditional deep nets typically have a pillow-case type design for the net area, such that debris can get stuck in the corners or edge "feet" of the pillow-case.) Providing a more oval-shaped deep net 82 adds to user ease because the debris can be removed much more quickly, conveniently, and efficiently.

Soft-Surface Vacuum Head

Figure 14:
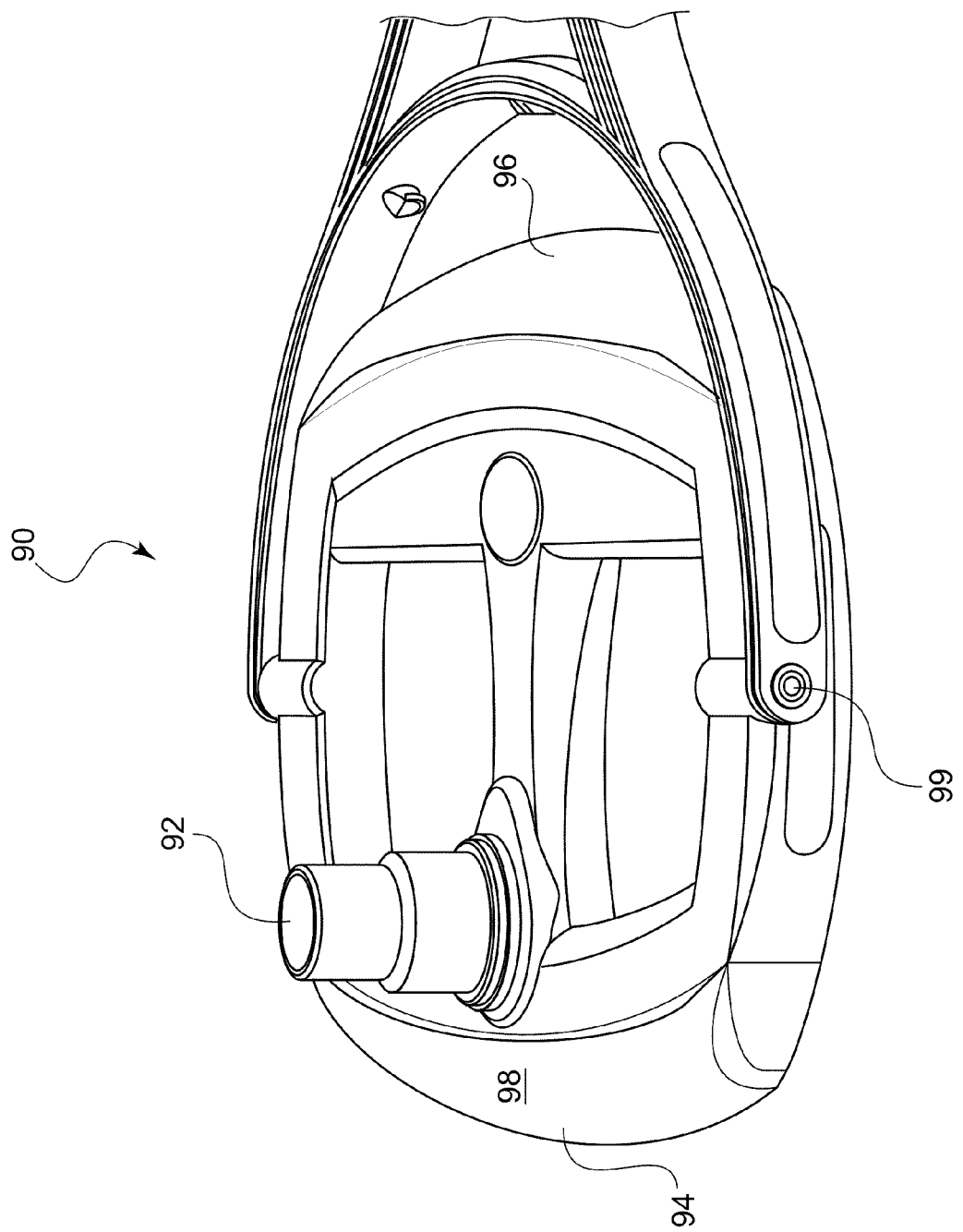
FIG. 14 shows a side perspective view of one embodiment of a soft-surface vacuum head secured to an accessory connecting element.
Figure 15:
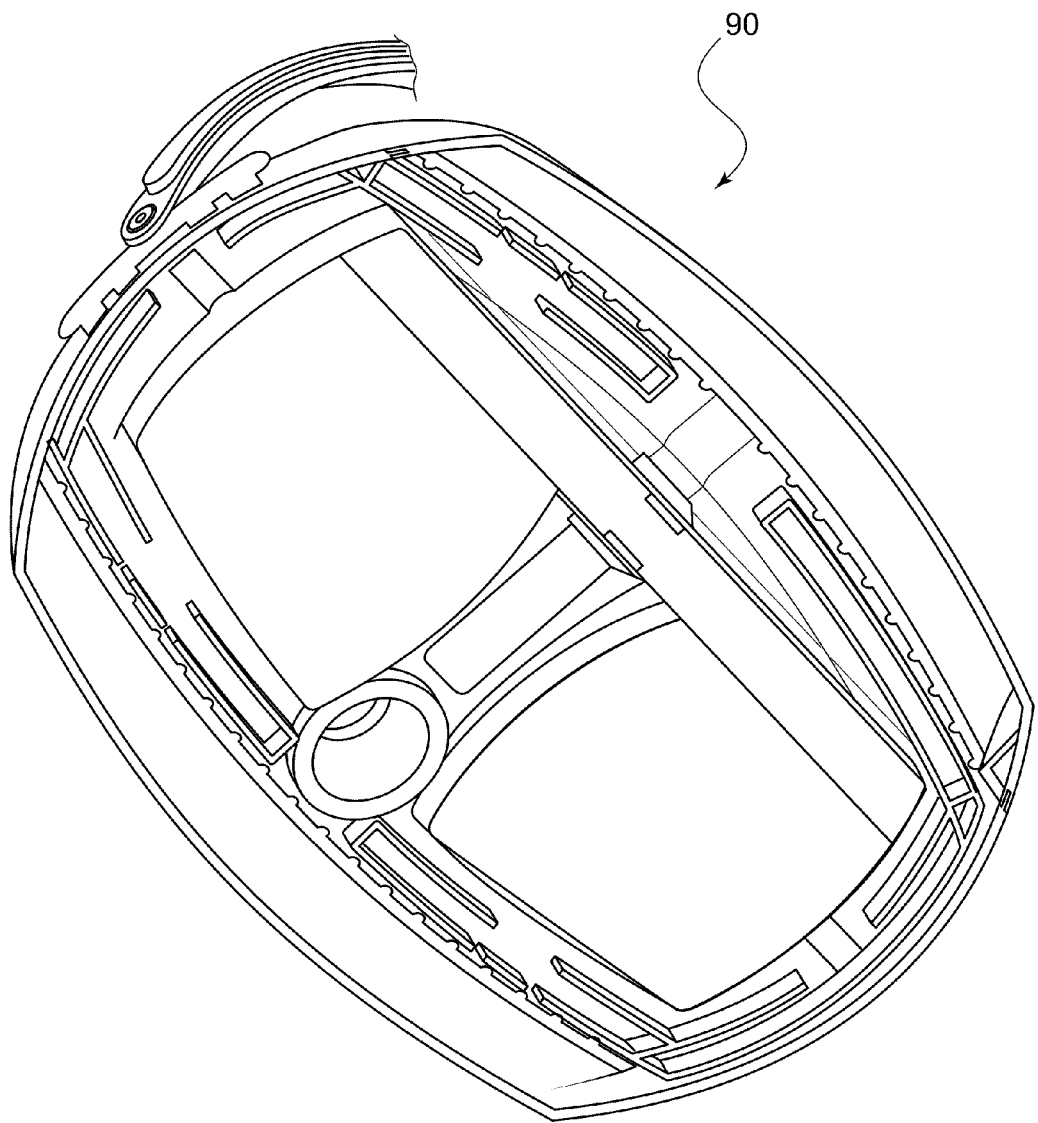
FIG. 15 shows an underside view of FIG. 14.

Examples of a soft-surface vacuum head 90 are shown in FIGS. 14-15. This vacuum head is useful for vacuuming vinyl and other soft-surfaced pools. Vacuum head 90 has a pipe 92 that is adapted to fit a flexible hose. Suction from the hose is transmitted through pipe 92 to suction debris from the bottom of the pool. In typical vacuum heads, the suction pipe is located at the center of the head. However, the distance between the front of vacuum head and the suction pipe, combined with the action of brushes that are typically associated with a soft-surface or vinyl pool vacuum head, actually pushes debris out of the way and to the sides before it can be suctioned away by the flexible hose. It also puts the debris into suspension, making it difficult to capture during the vacuuming process. Accordingly, the present inventors have designed the pipe 92 to be closer to the front edge 94 of vacuum head 90. This position improves debris pickup because less of the fine debris is disturbed prior to it reaching the suction port. They have also designed the bristles (not shown) to be attached to the bottom of the vacuum head toward the rear edge 96 of head 90. This allows the pipe 92 the "first chance" to suction, while still allowing the bristles to work and guide the head 90 along the pool floor and side surfaces. A ballast weight is also positioned at the rear of the vacuum head, which improves the stability of the head 90 in use.

Vacuum head may be secured to the system via a pivot point, similar to that described above in connection with the brush, although a low pivot point is not necessarily provided, needed or desired. By providing pivot points at the edges of the vacuum head, controlling the operation of the vacuum head is easier.

A further beneficial feature of vacuum head 90 is flexible disc 98. Flexible disc 98 improves debris pick-up by creating a low pressure area to improve suction. The disc 98 pivots in the direction of travel. Flexible discs may be provided at the front and back of the vacuum head to allow the vacuum head to be pushed into tight areas of the pool on its front end or back end (the disc will distort slightly when the vacuum head is pushed against a hard surface). In addition, the fact that the disc is able to move somewhat in a vertical or up-and-down direction enables the vacuum/suction to be more effective than if the frame was entirely rigid.

As with the above-described accessories, vacuum head 90 fits within the space 50 of accessory connecting element 40 and is secured thereto by attachment features 99 at edges of the head.

Hard-Surface Vacuum Head

Figure 16:
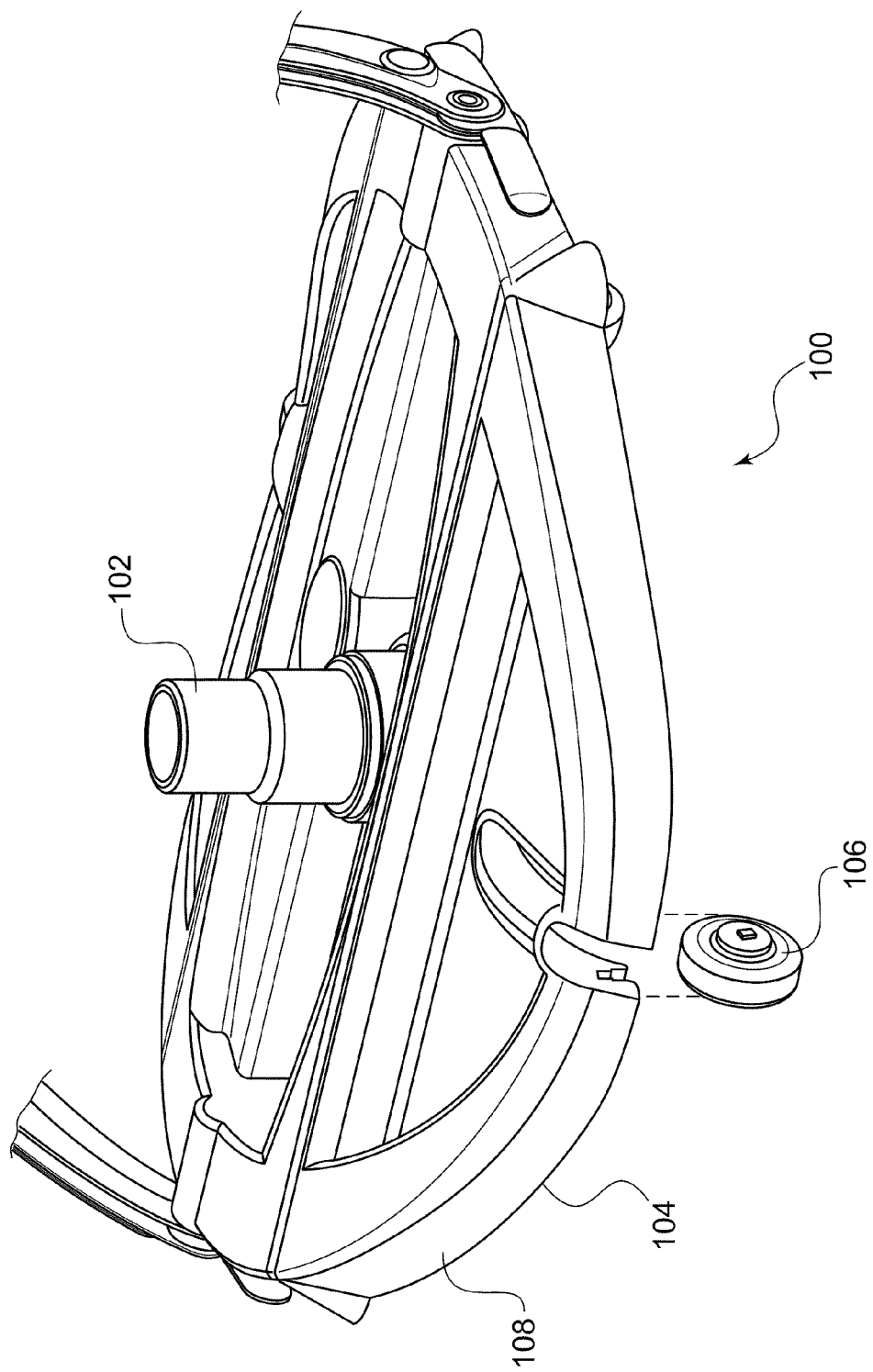
FIG. 16 shows a side perspective view of one embodiment of a hard-surface vacuum head secured to an accessory connecting element.
Figure 17:
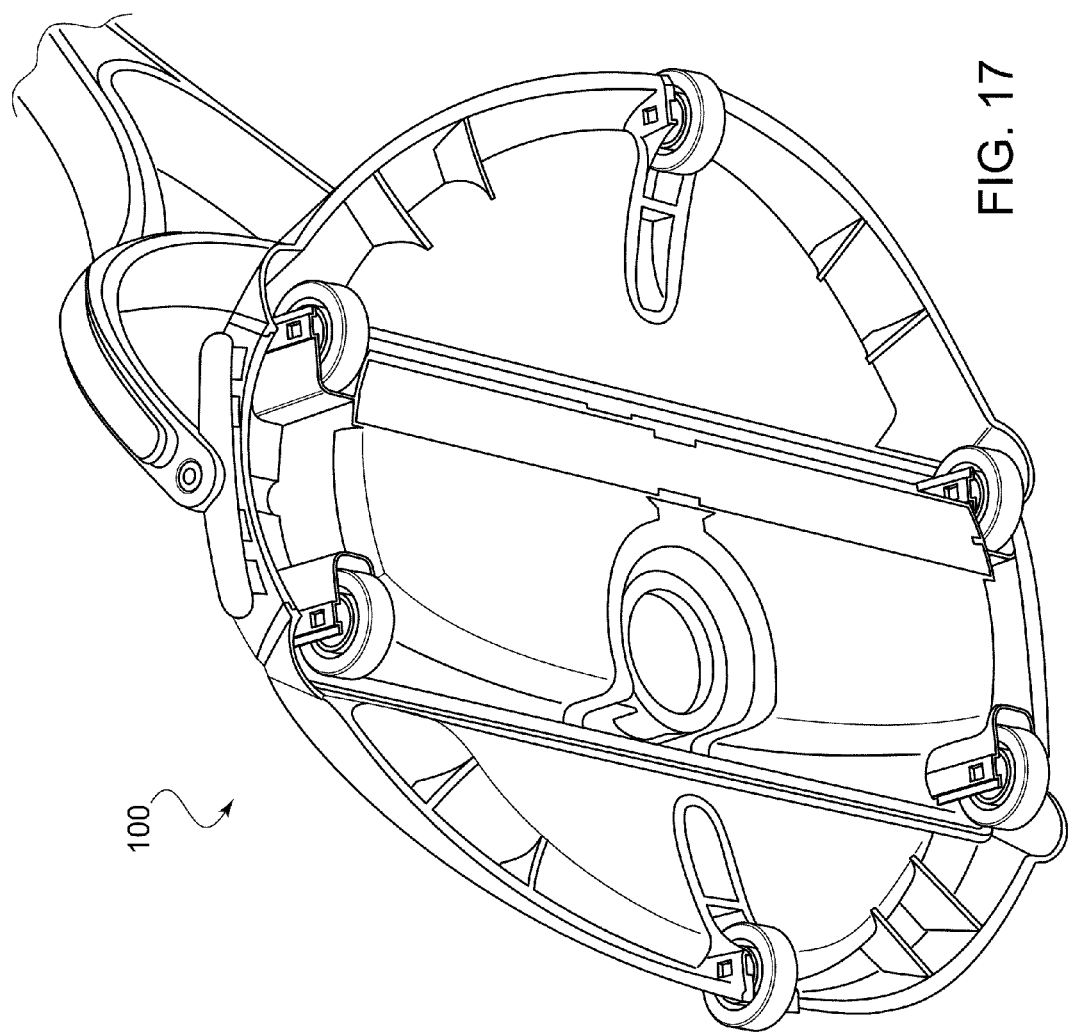
FIG. 17 shows an underside view of FIG. 16.

Examples of a hard-surface vacuum head 100 are shown in FIGS. 16-17. This vacuum head is useful for vacuuming gunite and other hard-surfaced pools. Vacuum head 100 also has a pipe 102 that is adapted to fit a flexible hose. Suction from the hose is transmitted through pipe 102 to suction debris from the bottom of the pool. Although pipe 102 is not located as close to front edge 104 of vacuum head 100 as pipe 92 is, it is still located closer toward the front edge 104 than the pipes of typical hard surface vacuum heads. Again, this position improves debris pickup because less of the fine debris is disturbed prior to it reaching the suction port. Vacuum head 100 also has wheels 106 instead of bristles, which allow vacuum head 100 to easily navigate the bottom and sides of the pool. Wheels 106 may be snap-fit to the vacuum head 100, which allows for faster and easier replacement when necessary.

Vacuum head 100 may further feature flexible flaps 108 that improve suction. Flaps 108 are pivotable in the direction of travel, and they allow the leading front edge 104 to travel partially up the pool wall so that the suction point is closer to the pool wall.

As with the above-described accessories, vacuum head 100 fits within the space 50 of accessory connecting element 40 and is secured thereto by attachment features 109.

Changes and modifications, additions and deletions may be made to the structures and methods recited above and shown in the drawings without departing from the scope or spirit of the invention.

What is claimed is:

1. A net for use with a pool cleaning system, comprising:
   (a) a net material portion;
   (b) a frame body comprising (i) a flexible inner frame portion providing structural support but deformable when pressed against a surface, wherein the flexible inner frame portion has a free rim-facing end; and (ii) an outer, flexible rim portion that is more malleable than the flexible inner frame portion and configured to provide a flexible rim edge for scooping, wherein the outer flexible rim portion has a free inner frame-facing end, wherein the free inner frame-facing end abuts the free rim-facing end of the flexible inner frame portion, wherein the flexible inner frame portion and the outer flexible rim portion are each comprised of one or more flexible materials, wherein the net material portion is trapped between the flexible inner frame portion and the outer flexible rim portion.

2. The net of claim 1, wherein the net portion comprises a deep net portion having an oval-shape.

3. The net of claim 1, wherein the net comprises at least two attachment features at sides of the net that are configured to be secured to a wishbone-shaped connecting element.

4. The net of claim 1, wherein the flexible rim edge comprises a plurality of openings.

5. The net of claim 1, further comprising an accessory connecting element for securing the net to a pole, the accessory connecting element having an accessory connection portion configured to cooperate with the net at at least two connection points and a pole connection portion configured to cooperate with the pole.

6. The net of claim 5, wherein the net is secured to the accessory connecting element by a rigid fixed connection to the accessory connection portion.

7. The net of claim 5, wherein the net is secured to the accessory connecting element by a pivotable, rotatable connection to the accessory connection portion.

8. The net of claim 5, wherein the accessory connection portion comprises at least two arms defining a space therebetween, the at least two arms forming a circumference of about half that of the frame body and with an attachment mechanism on each end of each arm configured to secure the net in place.

9. The net of claim 1, wherein the inner frame, the outer rim portion, or both comprises a thermoplastic elastomer, PVC, polyurethane, thermoplastic rubber, silicone, or a rubber-like material.

10. The net of claim 1, wherein the rim portion comprises a non-rectangular shape at its flexible rim edge.

11. The net of claim 1, wherein the net portion comprises a skimmer net.

12. A net for use with a pool cleaning system, comprising:
(a) a wishbone-shaped element comprising two arms with a space therebetween, the at least two arms forming a circumference of about half that of a frame body, each arm comprising an attachment mechanism;
(b) the frame body comprising (i) a first frame portion comprising a flexible inner portion providing structural support but deformable when pressed against a surface, wherein the flexible inner frame portion has a free rim-facing end; and (ii) a second frame portion comprising a flexible outer rim portion that is more malleable than the flexible inner frame portion and that provides a flexible rim edge for scooping, wherein second frame portion has a free inner frame-facing end, wherein the free inner frame-facing end abuts the free rim-facing end of the flexible inner frame portion, the frame body fixed to the wishbone-shaped element at the attachment mechanisms; and
(c) a net material portion trapped between the flexible inner portion and the flexible outer rim portion, such that the two frame portions secure the net material portion in place.

\* \* \* \* \*